United States Patent
Strandborg et al.

(10) Patent No.: US 12,483,616 B2
(45) Date of Patent: Nov. 25, 2025

(54) DATA PROCESSING SYSTEM AND METHOD FOR NETWORK PERFORMANCE OPTIMIZATION

(71) Applicant: Varjo Technologies Oy, Helsinki (FI)

(72) Inventors: Mikko Strandborg, Hangonkylä (FI); Tarmo Räntilä, Helsinki (FI); Antti Peuhkurinen, Helsinki (FI); Evgeny Zuev, Helsinki (FI); Juho Saarinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 99 days.

(21) Appl. No.: 18/543,146

(22) Filed: Dec. 18, 2023

(65) Prior Publication Data

US 2025/0202965 A1    Jun. 19, 2025

(51) Int. Cl.
*H04L 65/80* (2022.01)
*H04L 43/0852* (2022.01)
*H04L 65/612* (2022.01)

(52) U.S. Cl.
CPC .......... *H04L 65/80* (2013.01); *H04L 43/0852* (2013.01); *H04L 65/612* (2022.05)

(58) Field of Classification Search
CPC ... H04L 65/80; H04L 43/0852; H04L 65/612; H04L 65/752; H04N 21/2402;
(Continued)

(56) References Cited

U.S. PATENT DOCUMENTS

2015/0103894 A1*  4/2015  Diard ................... H04N 19/188
                                                    375/240.06
2019/0238609 A1*  8/2019  Skupin ............... H04N 21/4728
(Continued)

FOREIGN PATENT DOCUMENTS

WO      2022018483 A1    1/2022

OTHER PUBLICATIONS

European Patent Office, Extended European Search Report, Application No. 24216364.0, Mailed Apr. 4, 2025, 9 pages.

*Primary Examiner* — Tonia L Dollinger
*Assistant Examiner* — Mehulkumar J Shah
(74) *Attorney, Agent, or Firm* — ZIEGLER IP LAW GROUP LLC.

(57) ABSTRACT

Disclosed is data processing system having at least one server communicably couplable to at least one display apparatus, wherein at least one server has at least one processor configured to obtain quality of service information from network traffic regulator of communication network, wherein communication network is between at least one server and at least one display apparatus, obtain media processing latency information from at least one rendering application executing at the at least one server, and obtain client device operational information from at least one display apparatus; process quality of service information, media processing latency information, and client device operational information together to generate streaming configuration parameters; and control at least one rendering application to generate images for displaying at the at least one display apparatus and send images via communication network to at least one display apparatus, according to generated streaming configuration parameters.

14 Claims, 3 Drawing Sheets

(58) Field of Classification Search
CPC ......... H04N 21/2662; H04N 21/44218; H04N 21/6587; H04N 21/24; H04N 21/442; G06F 3/011; G06F 3/013; G06F 3/01
See application file for complete search history.

(56) References Cited

U.S. PATENT DOCUMENTS

| | | | |
|---|---|---|---|
| 2021/0274266 A1* | 9/2021 | Lohmar | H04L 65/611 |
| 2021/0377623 A1* | 12/2021 | Larson | H04N 21/239 |
| 2022/0351461 A1* | 11/2022 | Peuhkurinen | G06T 1/20 |
| 2023/0395041 A1* | 12/2023 | Fitzgerald | H04N 21/440281 |
| 2024/0033624 A1* | 2/2024 | Phillips | A63F 13/355 |
| 2024/0107082 A1* | 3/2024 | Fliam | H04N 21/2187 |

* cited by examiner

DATA PROCESSING SYSTEM AND METHOD FOR NETWORK PERFORMANCE OPTIMIZATION

TECHNICAL FIELD

The present disclosure relates to data processing systems. Moreover, the present disclosure relates to methods.

BACKGROUND

Conventionally, in low-latency network communication, utilization of User Datagram Protocol (UDP) packets for data transmission is a common practice. However, the UDP lacks mechanisms for ensuring delivery of data packets, and in congested scenarios, the data packets may be silently dropped. However, congestion control algorithms are effectively employed for managing transmission rates of UDP packets in the congested network transmission scenarios. Although, in the context of streaming Extended Reality (XR) rendering applications, an interplay between congestion control and latency prediction poses a significant challenge.

Typically, the XR rendering applications demand ultra-low latency over communication networks to synchronize rendering processes precisely with a vsync signal of display panels. Achieving this synchronization necessitates predictive timing algorithms that estimate a commencement of application rendering to ensure completion in tandem with a next display readout. However, the application of congestion control algorithms introduces variable latency to frame transmission, leading to inaccuracies in the latency prediction algorithms.

Therefore, in light of the foregoing discussion, there exists a need to overcome the aforementioned drawbacks.

SUMMARY

The aim of the present disclosure is to provide a data processing system and a method to minimize latency in image rendering. The aim of the present disclosure is achieved by a data processing system and a method for network performance optimization as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
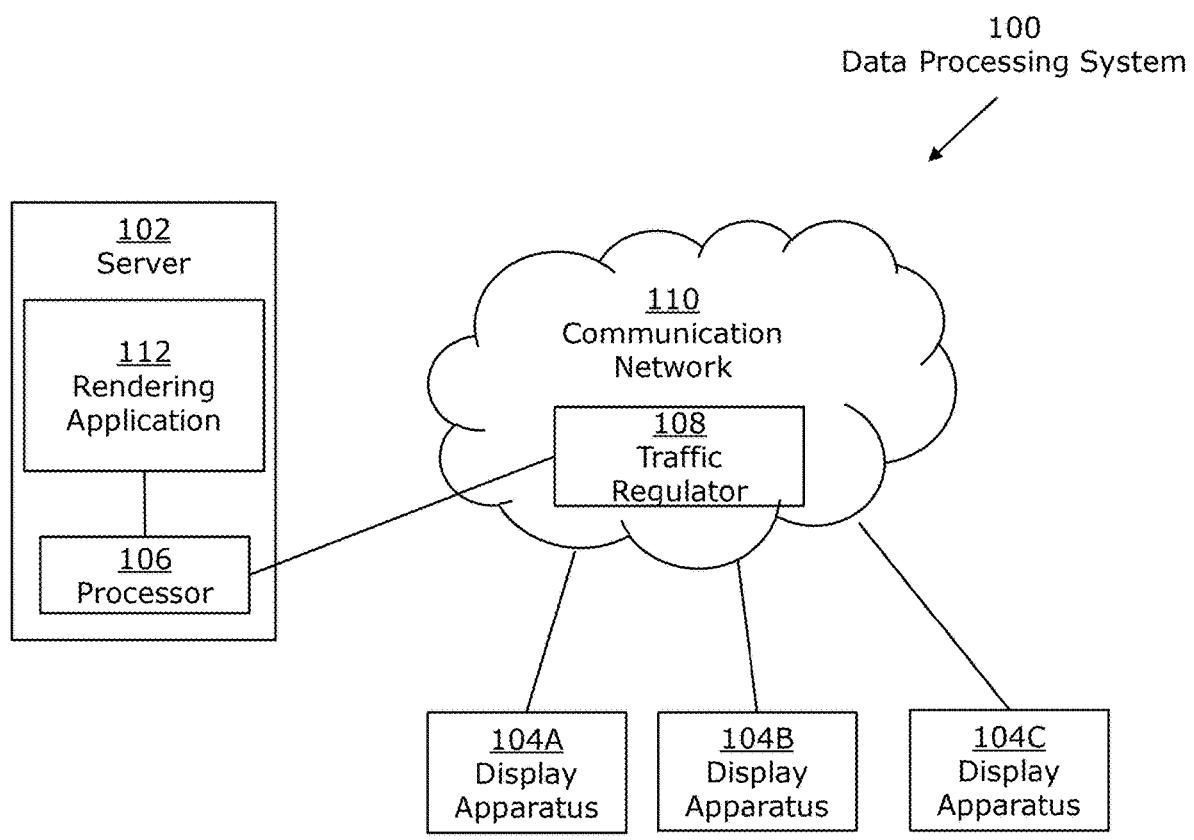
FIG. 1 is a block diagram of a data processing system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a data processing system comprising at least one server communicably couplable to at least one display apparatus, wherein the at least one server comprises at least one processor configured to:
  obtain a quality of service information from a network traffic regulator of a communication network, wherein the communication network is between the at least one server and the at least one display apparatus, obtain media processing latency information from at least one rendering application executing at the at least one server, and obtain client device operational information from the at least one display apparatus;
  process the quality of service information, the media processing latency information, and the client device operational information together to generate streaming configuration parameters; and
  control the at least one rendering application to generate images for displaying at the at least one display apparatus and send the images via the communication network to the at least one display apparatus, according to the generated streaming configuration parameters.

The present disclosure provides an aforementioned data processing system. The data processing system is able to accurately generate the streaming configuration parameters that optimizes a capacity of the communication network for facilitating an exchange of data between the at least one server and the at least one display apparatus. Moreover, the data processing system effectively manages congestion control in the communication network while maintaining a significantly low level of latency in generating the images for displaying at the at least one display apparatus and sending the images via the communication network from the at least one server to the at least one display apparatus.

In a second aspect, the present disclosure provides a method comprising:
  obtaining a quality of service information from a network traffic regulator of a communication network, wherein the communication network communicable couples at least one server and at least one display apparatus, obtaining media processing latency information from at least one rendering application executing at the at least one server, and obtaining client device operational information from the at least one display apparatus;
  processing the quality of service information, the media processing latency information, and the client device operational information together for generating streaming configuration parameters; and
  controlling the at least one rendering application to generate images for displaying at the at least one display apparatus and sending the images via the communication network to the at least one display apparatus, according to the generated streaming configuration parameters.

The present disclosure provides an aforementioned method. The method is able to accurately generate the streaming configuration parameters that optimizes a capacity of the communication network for facilitating an exchange of data between the at least one server and the at least one display apparatus. Moreover, the method effectively manages congestion control in the communication network while maintaining a significantly low level of latency in generating the images for displaying at the at least one display apparatus and sending the images via the communication network from the at least one server to the at least one display apparatus.

Throughout the present disclosure, the term "server" refers to a computational element that is operable to execute instructions of the at least one rendering application. It will be appreciated that the term "at least one server" refers to "one server" in some implementations, and "a plurality of servers" in other implementations. Examples of the at least one server include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the at least one server may refer to one or more individual servers, processing devices and various elements associated with a processing device that may be shared by other processing devices. Additionally, one or more individual servers, processing devices and elements are arranged in various architectures for responding to and processing the instructions that execute the at least one rendering application. Notably, the at least one server being communicably coupled to the at least one display apparatus enables exchange of data between the at least one server and the at least one display apparatus. Optionally, the at least one server is communicably coupled to the at least one display apparatus via one of: a Wi-Fi® module, a cellular network module, a Bluetooth® module, and the like.

Throughout the present disclosure "display apparatus" refers to specialized equipment that is configured to present an extended-reality (XR) environment to a user when the display apparatus in operation is worn by the user on his/her head. In such an instance, the display apparatus acts as a device (for example, such as an XR headset, a pair of XR glasses, and the like) that is operable to present a visual scene of the XR environment to the user. Commonly, the "display apparatus" is referred to as "head-mounted display apparatus", for the sake of convenience only. Throughout the present disclosure, the term "extended-reality" encompasses virtual reality (VR), augmented reality (AR), mixed reality (MR), and the like. It will be appreciated that the term "at least one display apparatus" refers to "one display apparatus" in some implementations and "a plurality of display apparatus" in other implementations.

Throughout the present disclosure, the term "processor" refers to computational element that is operable to execute instructions of the at least one server. It will be appreciated that the term "at least one processor" refers to "one processor" in some implementations, and "a plurality of processors" in other implementations. Examples of the at least one processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the at least one processor may refer to one or more individual processors, processing devices and various elements associated with a processing device that may be shared by other processing devices. Additionally, one or more individual processors, processing devices and elements are arranged in various architectures for responding to and processing the instructions that execute the at least one server.

Throughout the present disclosure, the term "communication network" refers to a network that allows different devices to exchange information therebetween. Notably, in the aforementioned data processing system, the communication network enables the at least one server to be communicably coupled to the at least one display apparatus for the exchange of data therebetween. In other words, the communication network acts as a medium through which the exchange of data takes place between the at least one server and the at least one display apparatus. Throughout the present disclosure, the term "network traffic regulator" refers to a mechanism that controls and manages flow of data packets in the communication network. Notably, the network traffic regulator regulates an amount of the data that can be sent or received over the communication network within a given timeframe. Throughout the present disclosure, the term "quality of service information" refers to information related to parameters that define a quality of service that is provided by the communication network. In other words, the quality of service information is that information which indicates how good or bad the communication network is performing to enable the exchange of data between the at least one server and the at least one display apparatus. Notably, since all communications over the communication network are managed by the network traffic regulator, thus, the network traffic regulator has the quality of service information which is obtained by the at least one processor from the network traffic regulator.

Optionally, the quality of service information comprises at least one of: a latency, a data transfer rate, a data packet loss ratio in the communication network. Throughout the present disclosure, the term "latency" refers to a time that is taken for the data to travel over the communication network, between the at least one server and the at least one display apparatus. Optionally, the quality of service information comprises the latency in the communication network because a high latency in the communication network indicates a low quality performance of the communication network, and vice versa. Throughout the present disclosure, the term "data transfer rate" refers to a speed at which the data is shared between the at least one server and the at least one display apparatus over the communication network. Optionally, the quality of service information comprises the data transfer rate in the communication network because a high data transfer rate in the communication network indicates a high quality performance of the communication network, and vice versa. Throughout the present disclosure, the term "data packet loss ratio" refers to a proportion of data packets that fail to reach to their destination in the exchange of data between the at least one server and the at least one display apparatus. Optionally, the quality of service information comprises the data packet loss ratio in the communication network because a high data packet loss ratio in the communication network relates to a higher loss of information during the exchange of data between the at least one server and the at least one display apparatus which indicates the low quality performance of the communication network, and vice versa. Optionally, the quality of service information comprises current values and/or historical values of the at least one of: the latency, the data transfer rate, the data packet loss ratio in the communication network. The current values of the at least one of: the latency, the data transfer rate, the data packet loss ratio in the communication network enables to determine the quality of the performance of the communication network in a current instance of time. The historical values of the at least one of: the latency, the data transfer rate, the data packet loss ratio in the communication network enables to determine how the quality of the performance of the communication network has been historically and subsequently, predict the quality of the performance of the communication network in the current instance of time.

Throughout the present disclosure, the term "rendering application" refers to that application which renders images related to the XR environment that is to be displayed to the user via the at least one display apparatus. It will be appreciated that the term "at least one rendering application" refers to "one rendering g application" in some implementations, and "a plurality of rendering applications" in other implementations. It will be appreciated that the at least one rendering application is executed at the least one server. Notably, information related to the XR environment that is used by the at least one rendering application to render the images, is received by the at least one server from the at least one display apparatus. Throughout the present disclosure, the term "media processing latency information" refers to information related to parameters that define how much latency is present in the processing of images by the at least one rendering application, before the images are ready to be sent from the at least one server to the at least one display apparatus. In other words, the media processing latency information indicates how much time is taken for the processing of a given image before that image is ready to be sent from the at least one server to the at least one display apparatus.

Optionally, the media processing latency information comprises at least one of: a duration within which an image is to be rendered, a duration of encoding and packing the image before a transmission of the image, a rendering latency. Throughout the present disclosure, the term "duration within which the image is to be rendered" refers to a time period that is available to render the image for the image to be timely sent to the at least display apparatus to be timely displayed to the user in a synchronized manner. Optionally, the media processing latency information comprises the duration within which an image is to be rendered to have a limit on a maximum time the at least one rendering application may take to render the image. Throughout the present disclosure, the term "duration of encoding and packing the image before a transmission of the image" refers to a time that is to encode and pack the image after being rendered by the at least one rendering application, and before the image is transmitted from the at least one server to the at least one display apparatus. Throughout the present disclosure, the term "rendering latency" refers to a difference of time between a time instance when the rendering of the image is started by the at least one rendering application and a time instance when the image is finally rendered by the at least one rendering application. Optionally, the media processing latency information comprises the rendering latency to estimate how much time is required for rendering the image by the at least one rendering application. Optionally, the media processing latency information comprises current values and/or historical values of the at least one of: the duration within which the image is to be rendered, the duration of encoding and packing the image before the transmission of the image, the rendering latency. The current values of the at least one of: the duration within which the image is to be rendered, the duration of encoding and packing the image before the transmission of the image, the rendering latency enables to determine how much time is taken for the processing of the image before the image is ready to be sent from the at least one server to the at least one display apparatus. The historical values of the at least one of: the latency, the data transfer rate, the data packet loss ratio in the communication network enables to determine how much time is taken for the processing of a given image before that image is ready to be sent from the at least one server to the at least one display apparatus, predict the quality of the performance of the communication network in the current instance of time.

Throughout the present disclosure, the term "client device operational information" refers to information related operational parameters related to the display apparatus and the user of the display apparatus. Optionally, the client device operational information comprises at least one of: a pose information indicative of a pose of the at least one display apparatus, gaze information indicative of a gaze direction of a given eye of the user of the at least one display apparatus, an input of an input device of the at least one display apparatus, a status of upstream dataflows from the at least one display apparatus, or a plurality of network traffic characteristics of at least one other display apparatus that is also coupled to the communication network. Throughout the present disclosure, the term "pose of the at least one display apparatus" refers to a position and/or orientation of the at least one display apparatus in a real world environment in which the at least one display apparatus is used. The pose information indicative of the pose of the at least one display apparatus is received from a pose-tracking means (well-known in the art). Throughout the present disclosure, the term "gaze direction" refers to a direction in which the given eye (i.e., either of two eyes of the user) of the user is gazing. The gaze direction may be represented by a gaze vector. The gaze information indicative of the gaze direction of the given eye of the user of the at least one display apparatus, is received from a gaze-tracking means (well-known in the art). Throughout the present disclosure, the term "upstream dataflows from the at least one display apparatus" refers to a transfer of data from the at least one display apparatus to the at least one server. The status of the upstream dataflows from the at least one display apparatus indicates parameters related to the upstream dataflows from the at least one display apparatus. Throughout the present disclosure, the term "at least one other display apparatus" refers to one more other display apparatuses apart from the at least one display apparatus, which also uses the communication network for the exchange of data. The plurality of the network characteristics of the at least one other display apparatus indicates how the communication network gets impacted by use of the at least one other display apparatus. Notably, the client device operational information received from the at least one display apparatus indicates how the at least one display apparatus impacts a usage and capacity of the communication network.

Throughout the present disclosure, the term "streaming configuration parameters" refers to those parameters which define a manner in which the at least one rendering application and the communication network is configured for timely generating and sending the images from the at least one server to the at least one display apparatus to ensure a synchronized and glitch-free displaying of the images by the at least one display apparatus. Optionally, the streaming configuration parameters comprise at least one of: a congestion control parameter, error correction data, a predicted network latency, a predicted rendering latency, a synchronization parameter for rendering, an encoding setting, a display setting, a rate at which tracking data is received by the at least one server from the at least one display apparatus. Throughout the present disclosure, the term "congestion control parameter" refers to that parameter which regulate a flow of the data being shared over the communication network in order to prevent congestion in the communication network. The congestion control parameter determines how much data is to be shared over the communication network to minimize the congestion. Throughout the present disclosure, the term "error correction data" refers to additional information that is added to the data shared over the communication network to detect and fix any errors that may occur (from factors such as noise, interference, disruptions, and the like) during the sharing of data. Throughout the present disclosure, the term "predicted network latency" refers to an expected value of latency to be present in sharing the data over the communication network. Throughout the present disclosure, the term "predicted rendering latency" refers to an expected value of latency to be present in rendering of the images by the at least one rendering application. Throughout the present disclosure, the term "synchronization parameter for rendering" refers to that parameter which synchronizes the rendering of the images with respect to each other by providing a time stamp indicating when the rendering of each image starts and ends. Throughout the present disclosure, the term "encoding setting" refers to a setting according to which the images are encoded after being rendered by the at least one rendering application. Throughout the present disclosure, the term "display setting" refers to a particular setting according to which the images are displayed by the at least one display apparatus, such as a frame rate, an image resolution, and the like. Throughout the present disclosure, the term "tracking data" refers to pose-tracking data of the display apparatus and/or the gaze-tracking data of the given eye of the user of the display apparatus. The rate at which the tracking data is received indicates a speed with which the tracking data is received by the at least one server from the at least one display apparatus. A technical effect of the streaming configuration parameters comprising the at least one of: the congestion control parameter, the error correction data, the predicted network latency, the predicted rendering latency, the synchronization parameter for the rendering, the encoding setting, the display setting, the rate at which the tracking data is received by the at least one server from the at least one display apparatus, is that the streaming configuration parameters include a wide range of parameters and attributes which impact the synchronized and glitch-free displaying of the images by the at least one display apparatus.

Notably, processing the quality of service information, the media processing latency information, and the client device operational information together to generate the streaming configuration parameters involves analyzing and determining relationships between the quality of service information, the media processing latency information, and the client device operational information in order to determine what are the streaming configuration parameters that are to be generated to ensure the synchronized and glitch-free displaying of the images by the at least one display apparatus. For example, the at least one processor processes a client frame response time which is in a range of 7 to 9 milliseconds (ms) to generate a predicted frame response time to be in a range of 9.5 to 12.5 ms. Optionally, the at least one processor employs at least one artificial intelligence model to process the quality of service information, the media processing latency information, and the client device operational information together to generate the streaming configuration parameters. Optionally, the at least one artificial intelligence model is implemented as one of: a neural network model (based on a conventional time series forecasting model), an expert system model.

Optionally, the at least one artificial intelligence model is implemented as the neural network model, and the at least one processor is further configured to:
compute a value of a loss function, based on values of at least one of: an actual packet loss ratio, an actual network latency, an actual network data transfer rate, an error in the predicted latency in the communication network, an error in the predicted rendering latency, an achieved quality per stream of data packets, for at least one previous instance of employing the at least one artificial intelligence model;
determine whether the value of the loss function is higher than an acceptable loss value; and
when it is determined that the value of the loss function is higher than the acceptable loss value, re-train the at least one the neural network model using the value of the loss function and re-training data, for enabling in reducing the value of the loss function for subsequent instances of employing the at least one artificial intelligence model.

Throughout the present disclosure, the term "images for displaying at the at least one display apparatus" refers to those images rendered by the at least one rendering application to represent the XR environment by being displayed at the at least one display apparatus. Notably, the at least one rendering application is controlled according to the generated streaming configuration parameters as the parameters in the generated streaming configuration parameters are generated to have optimum values to ensure the synchronized and glitch-free displaying of the images by the at least one display apparatus. Moreover, the images are sent to the at least one display apparatus via the communication network according to the generated streaming configuration parameters as the parameters in the generated streaming configuration parameters are determined to utilize the communication network in an optimum manner that ensures the synchronized and glitch-free displaying of the images by the at least one display apparatus.

Optionally, the at least one processor is further configured to:
obtain, from the at least one display apparatus, an input indicative of an upcoming transmission of a stream of data packets from the at least one display apparatus to the at least one server; and
perform one of: transmission of a pending stream of data packets from the at least one server to the at least one display apparatus on priority to clear network send queues, activation of a delay mechanism that temporarily pauses current data transmission and subsequently allows burst transmission of the pending stream of data packets to the at least one display apparatus for clearing network send queues, based on said input, to free up network bandwidth prior to the upcoming transmission.

In this regard, the term "stream of data packets" refers to a sequence of discrete chunks of data. Throughout the present disclosure, the term "upcoming transmission of the stream of data packets" refers to a transmission of the stream of data packets from the at least one display apparatus to the at least one server that is going take place at a future instance of time. Throughout the present disclosure, the term "input indicative of the upcoming transmission of the stream of data packets" refers to that input from which it is determined that the upcoming transmission of the stream of data packets is going to take place. Notably, obtaining from the at least one display apparatus, the input indicative of the upcoming transmission of the stream of data packets enables the at least one server to subsequently, plan and make necessary adjustments therein to make the at least one server suitable to receive the upcoming transmission of the stream of data packets from the at least one display apparatus. It will be appreciated that to make the at least one server suitable to receive the upcoming transmission of the stream of data packets, the network bandwidth needs to be free prior to the upcoming transmission. Throughout the present disclosure, the term "network bandwidth" refers to a maximum capacity at which the data packets can be transmitted over the communication network (typically, measured in one of: bits per second, kilobits per second, and the like). Throughout the present disclosure, the term "network send queues" refers to temporary storage buffers present in the at least one server where outgoing data packets are held before being transmitted to their intended destination. Throughout the present disclosure, the term "pending stream of data packets" refers to that stream of data packets which is kept as pending in the network send queues of the at least one server, to be transmitted in future. Optionally, the transmission of the pending stream of data packets from the at least one server to the at least display apparatus on priority to clear the network send queues ensures that the network bandwidth does not get occupied with the transmission of the pending stream of data packets prior to the upcoming transmission of the stream of data packets from the at least one display apparatus to the at least one server. Alternatively, the activation of the delay mechanism that temporarily pauses the current data transmission and subsequently allows the burst transmission of the pending stream of data packets also ensures that the network bandwidth does not get occupied with the transmission of the pending stream of data packets prior to the upcoming transmission of the stream of data packets. Notably, the activation of the delay mechanism puts the current data transmission on temporary hold to allow the burst transmission of the pending stream of data packets. A technical effect is that the communication network is effectively optimized to handle the upcoming transmission of the stream of data packets.

Optionally, the at least one processor is further configured to:
  obtain, from the at least one display apparatus, information indicative of at least a gaze direction of a given eye of a user of the at least one display apparatus and at least one of: a gaze velocity, a gaze acceleration, of the given eye;
  determine an amount of variation in visual content that is to be represented in an encoded video stream which is to be transmitted from the at least one server to the at least one display apparatus, based on the information; and
  adjust at least one of: a network setting, an encoding setting, for transmission of the encoded video stream, based on the amount of variation.

In this regard, the term "gaze velocity" refers to a rate with which the gaze direction of the given eye of the user shifts from one position to another position. Throughout the present disclosure, the term "gaze acceleration" refers to a rate with which the gaze velocity of the given eye of the user shifts from one position to another position. Optionally, the obtained information comprises different types of at least one input, for example, a user audio input, in addition to the at least one of: the gaze direction, the gaze velocity, the gaze acceleration. It will be appreciated that the visual content that is to be represented in the encoded video stream is based on a gaze region identified in the visual content. Throughout the present disclosure, the term "video content" refers to those images representing the XR environment that is to be rendered by the at least one streaming application for being displayed in the encoded video stream. Throughout the present disclosure, the term "encoded video stream" refers to a video streaming of the images of the visual content stored in an encoded form. Notably, obtaining the information indicative of at least: the gaze direction, the gaze velocity, the gaze acceleration, enables to determine how the gaze region in the visual content changes. Subsequently, the amount of variation is determined from how the gaze region in the visual content changes, based on the information. Notably, the information is used to compare the gaze region in the image with the gaze region in a subsequent image to determine the amount of variation. If there is a significantly high difference between the gaze region in the image and the gaze region in the subsequent image, then the amount of variation is significantly high, and vice versa. It will be appreciated that for maintaining a video quality in the encoded video stream, the at least one of: the network setting, the encoding setting, are adjusted based on the amount of variation. Throughout the present disclosure, the term "network setting" refers to configurations of the communication network. Optionally, the network setting comprises at least one of: a network protocol configuration, a routing and switching configuration, a quality of service (QOS), firewall and security configurations, a bandwidth management, a proxy server configuration. Notably, if the amount of variation in the visual content is higher than average, then the network setting is adjusted to a higher degree than average, and vice versa. Throughout the present disclosure, the term "encoding setting" refers to configurations according to which the visual content is compressed and encoded. Notably, if the amount of variation in the visual content is higher than average, then the encoding setting is adjusted to a higher degree than average, and vice versa. A technical effect is that the visual quality of the visual content that is to be represented in the encoded video stream is effectively maintained even when variation in the visual content occurs.

Optionally, the at least one processor is further configured to:
  determine whether the quality of service information is indicative of challenging network conditions;
  determine an expected error in pose information prediction and gaze information prediction; and
  when it is determined that the quality of service information is indicative of the challenging network conditions and the expected error is less than a predetermined threshold, reduce a frequency of obtaining subsequent pose information and subsequent gaze information from the at least one display apparatus.

In this regard, the term "challenging network conditions" refers to those conditions which pertains to the communication network not performing as per required levels. It will be appreciated that the quality of service information is known in the art. Optionally, the quality of service information is determined to be indicative of the challenging network conditions when at least one of the following is true: the latency in the communication network is greater than a first predefined threshold, the data transfer rate in the communication network is less than a second predefined threshold, the data packet loss ratio in the communication network is greater than a third predefined threshold. Throughout the present disclosure, the term "first predefined threshold" refers to a maximum value for the latency in the communication network below which the communication network performs as per the required levels. Throughout the present disclosure, the term "second predefined threshold" refers to a minimum value for the data transfer rate in the communication network above which the communication network performs as per the required levels. Throughout the present disclosure, the term "third predefined threshold" refers to a maximum value for the data packet loss ratio in the communication network below which the communication network performs as per the required levels. Notably, the exchange of data over the communication network gets difficult under challenging network conditions.

Throughout the present disclosure, the term "pose information prediction" refers to a prediction of the pose of the at least one display apparatus which is done by the at least one server, without receiving any pose information from the at least one display apparatus. Throughout the present disclosure, the term "gaze information prediction" refers to a prediction of the gaze direction of the of the given eye of the user which is done by the at least one server, without receiving any gaze information from the at least one display apparatus. Throughout the present disclosure, the term "expected error" refers to an error that is expected to be present in determining the pose information prediction and the gaze information prediction by the at least one server. Notably, the expected error is an indication of an accuracy in the pose information prediction and the gaze information prediction. Subsequently, the expected error being less than the predefined threshold indicates that the pose information prediction and the gaze information prediction of the at least one processor is reliable, and vice versa. As a result, the at least one processor need not obtain the subsequent pose information and the subsequent gaze information from the at least one display apparatus at a higher frequency, as the pose information prediction and the gaze information prediction of the at least one processor itself is reliable. Optionally, the predefined threshold varies depending on the network conditions. Optionally, the predefined threshold is in a range of 0 to 2 centimeters for the pose information prediction and 0 to 5 degrees for the gaze prediction information. Notably, when it is determined that the quality of service information is indicative of the challenging network conditions and the expected error is less than a predetermined threshold, then the exchange of data over the communication network is difficult and thus, obtaining the subsequent pose information and the subsequent gaze information from the at least one display apparatus is difficult, while at the same time the pose information prediction and the gaze information prediction of the at least one processor itself is reliable. Subsequently, the frequency of obtaining the subsequent pose information (wherein, optionally, the pose information comprises at least one of: pose information indicative of a pose of the at least one display apparatus, pose information indicative of a pose of at least one input device of the at least one display apparatus) and the subsequent gaze information from the at least one display apparatus is reduced, as the exchange of data over the communication network (i.e., obtaining the subsequent pose information and the subsequent gaze information from the at least one display apparatus) is difficult and the prediction of the subsequent pose and the subsequent gaze direction is accurately done by the at least one processor. A technical effect is that even under the challenging network conditions, the at least one processor is able to predict the subsequent pose and the subsequent gaze direction accurately, without a need for frequently obtaining the subsequent pose information and the subsequent gaze information from the at least one display apparatus.

Optionally, the data processing system comprises at least two servers communicably coupled to each other, and wherein a given server amongst the at least two servers is configured to:
  obtain, from at least one remaining server from amongst the at least two servers, network traffic characteristics corresponding to the at least one remaining server, wherein at least one other display apparatus is communicably coupled to the at least one remaining server;
  determine a correlation between network traffic characteristics of the given server and the obtained network traffic characteristics corresponding to the at least one remaining server; and
  adjust at least one setting of the given server, based on the correlation.

In this regard, the term "given server" refers to a specific server from amongst the at least two servers communicably coupled to each other. Throughout the present disclosure, the term "at least one remaining server" refers to one or more servers remaining in the at least two servers after excluding the given server from amongst the at least two servers. Throughout the present disclosure, the term "network traffic characteristics" refers to characteristics or attributes that define conditions and quality of how the data is being shared over the communication network by a specific server. Notably, obtaining the network traffic characteristics corresponding to the at least one remaining server enables to determine how the network characteristics corresponding to the at least one remaining server impacts the network characteristics of the given server. The correlation between the obtained network traffic characteristics corresponding to the at least one remaining server and the network traffic characteristics corresponding to the given server is determined which indicates how the obtained network traffic characteristics corresponding to the at least one remaining server impacts the network traffic characteristics corresponding to the given server. Subsequently, the at least one setting is adjusted based on the correlation to optimize the exchange of data over the communication network. A technical effect is that the data processing system effectively manages the exchange of data over the communication network even in scenarios when at least two servers are present.

The present disclosure also relates to the method as described above. Various embodiments and variants disclosed above, with respect to the aforementioned data processing system, apply mutatis mutandis to the method.

Optionally, generating the streaming configuration parameters comprise generating at least one of: a congestion control parameter, error correction data, a predicted network latency, a predicted rendering latency, a synchronization parameter for rendering, an encoding setting, a display setting, or a rate at which tracking data is received by the at least one server from the at least one display apparatus.

Optionally, the method further comprises:
  obtaining, from the at least one display apparatus, an input indicative of an upcoming transmission of a stream of data packets from the at least one display apparatus to the at least one server; and
  performing one of: transmission of a pending stream of data packets from the at least one server to the at least one display apparatus on priority to clear network send queues, activation of a delay mechanism that temporarily pauses current data transmission and subsequently allows burst transmission of the pending stream of data packets to the at least one display apparatus for clearing network send queues, based on said input, to free up network bandwidth prior to the upcoming transmission.

Optionally, the method further comprises:

obtaining, from the at least one display apparatus, information indicative of at least a gaze direction of a given eye of a user of the at least one display apparatus and at least one of: a gaze velocity, a gaze acceleration, of the given eye;

determining an amount of variation in visual content that is to be represented in an encoded video stream which is to be transmitted from the at least one server to the at least one display apparatus, based on the information; and adjusting at least one of: a network setting, an encoding setting, for transmission of the encoded video stream, based on the amount of variation.

Optionally, the method further comprises:

determining whether the quality of service information is indicative of challenging network conditions;

determining an expected error in pose information prediction and gaze information prediction; and when it is determined that the quality of service information is indicative of challenging network conditions and the expected error is less than a predetermined threshold, reducing a frequency of obtaining subsequent pose information and subsequent gaze information from the at least one display apparatus.

Optionally, the method further comprises:

obtaining at a given server amongst at least two servers, from at least one remaining server from amongst the at least two servers, network traffic characteristics corresponding to the at least one remaining server, wherein at least one other display apparatus is communicably coupled to the at least one remaining server;

determining a correlation between network traffic characteristics of the given server and the obtained network traffic characteristics corresponding to the at least one remaining server; and adjusting at least one setting of the given server, based on the correlation.

The present disclosure also relates to the computer program as described above. Various embodiments and variants disclosed above, with respect to the aforementioned data processing system and the aforementioned method, apply mutatis mutandis to the computer program.

The present disclosure also relates to the computer-readable medium as described above. Various embodiments and variants disclosed above, with respect to the aforementioned data processing system, the aforementioned method and the aforementioned computer program apply mutatis mutandis to the computer-readable medium.

DETAILED DESCRIPTION OF THE DRAWINGS

Referring to FIG. 1, illustrated is a block diagram of a data processing system 100, in accordance with an embodiment of the present disclosure. As shown, the data processing system 100 comprises at least one server 102 communicably coupled to at least one display apparatus (depicted as display apparatuses 104A-C). The at least one server 102 comprises at least one processor 106. The at least one processor 106 is configured to receive a quality of service information from a network traffic regulator 108 of a communication network 110, wherein the communication network 110 is between the at least one server 102 and the at least one display apparatus 104A-C, obtain media processing latency information from at least one rendering application 112 executed at the at least one server 102, and obtain client device operational information from the at least one display apparatus 104A-C. Moreover, the at least one processor 106 is configured to process the quality of service information, the media processing latency information, and the client device operational information together to generate streaming configuration parameters. Furthermore, the at least one processor 106 is configured to control the at least one rendering application 112 to generate images for displaying at the at least one display apparatus 104A-C and send the images via the communication network 110 to the at least one display apparatus 104A-C, according to the generated streaming configuration parameters.

Figure 2:
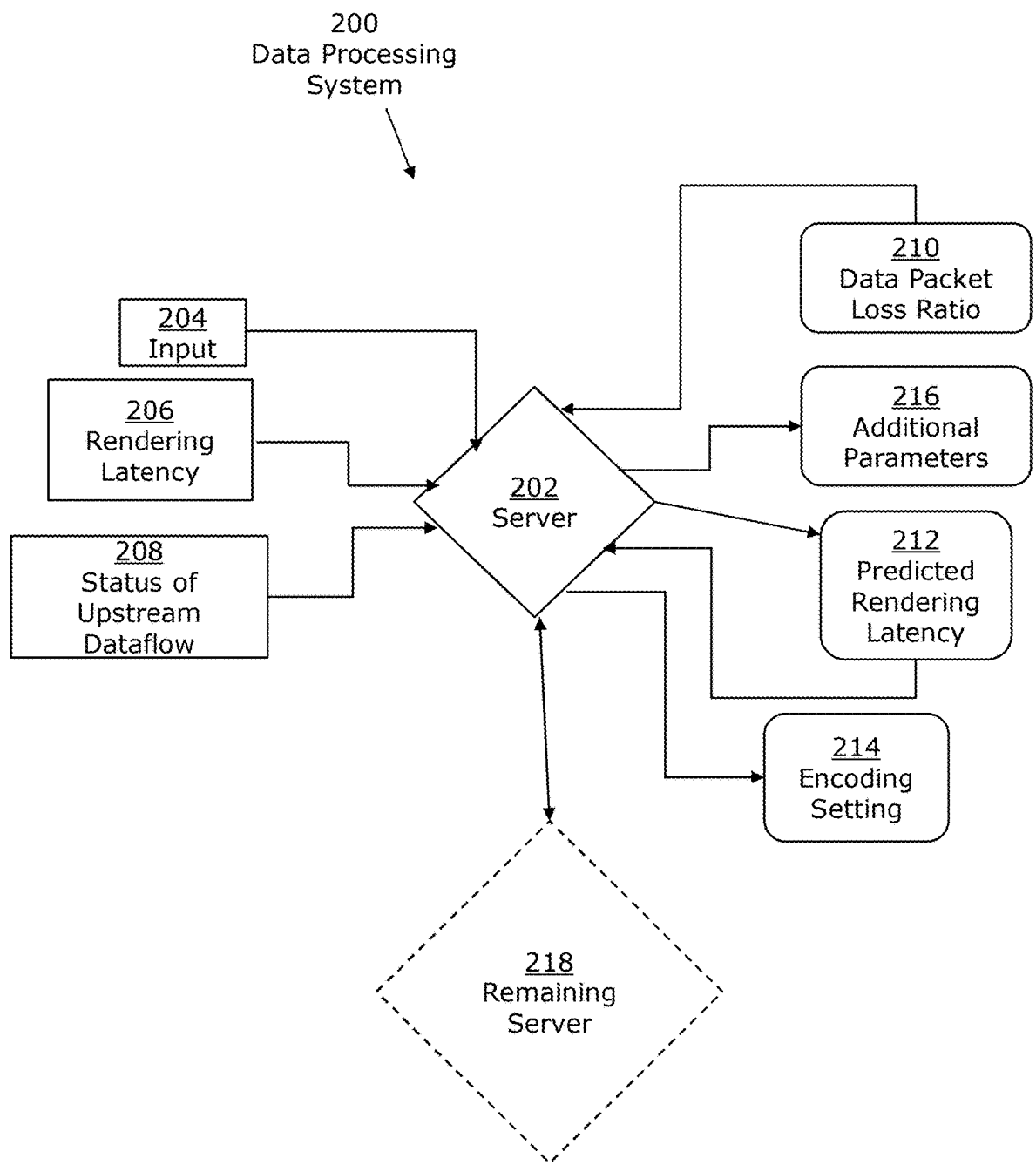
FIG. 2 is a block diagram of an exemplary scenario of a data processing system, in accordance with an embodiment of the present disclosure.

Referring to FIG. 2, illustrated is a block diagram of an exemplary scenario of a data processing system 200, in accordance with an embodiment of the present disclosure. As shown, the data processing system 200 comprises a given server 202. The given server 202 receives a user input 204, a rendering latency 206, a status of upstream dataflow 208, a data packet loss ratio 210. Moreover, the given server 202 generates a predicted rendering latency 212, an encoding setting 214 and a set of additional parameters 216 (comprising throughput data bandwidth, predicted near-future data, predicted network condition). Furthermore, the given server 202 obtains from at least one remaining server 218, network traffic characteristics corresponding to the at least one remaining server 218.

Figure 3:
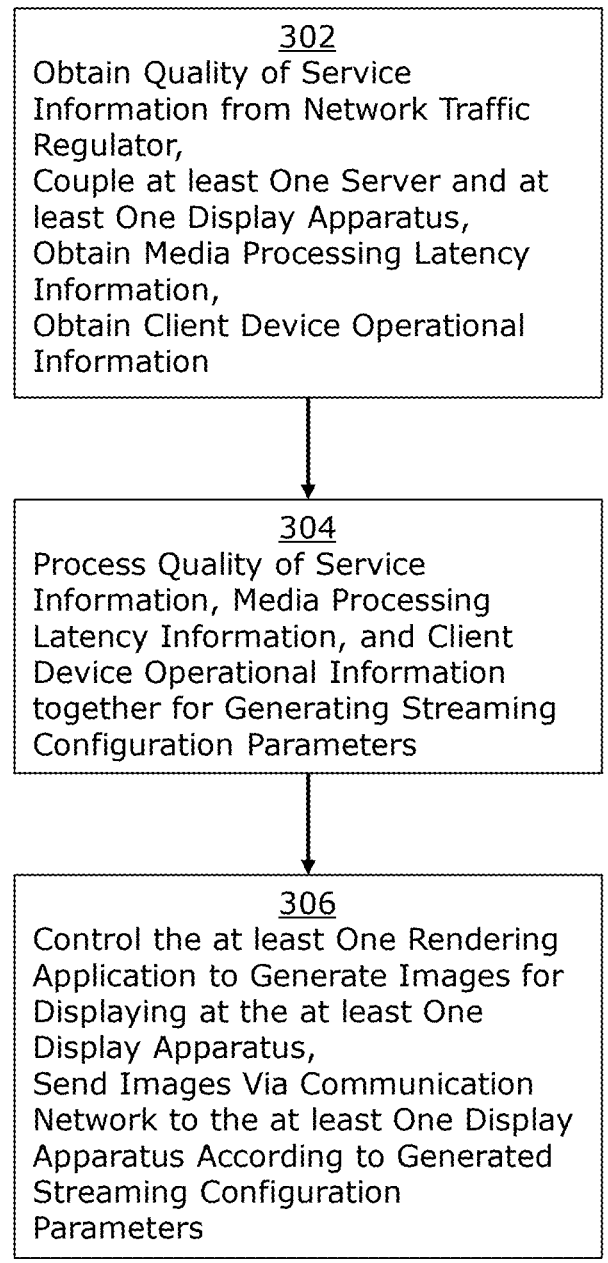
FIG. 3 is a flowchart depicting steps for a method, in accordance with an embodiment of the present disclosure.

Referring to FIG. 3, illustrated is a flowchart depicting steps for a method, in accordance with an embodiment of the present disclosure. At step 302, a quality of service information is obtained from a network traffic regulator of a communication network, wherein the communication network communicable couples at least one server and at least one display apparatus, obtaining media processing latency information from at least one rendering application executing at the at least one server, and obtaining client device operational information from the at least one display apparatus. At step 304, the quality of service information, the media processing latency information, and the client device operational information are processed together for generating streaming configuration parameters. At step 306, the at least one rendering application is controlled to generate images for displaying at the at least one display apparatus and the images are sent via the communication network to the at least one display apparatus, according to the generated streaming configuration parameters.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method comprising:

obtaining a quality of service information from a network traffic regulator of a communication network, wherein the communication network communicable couples at least one server and at least one display apparatus, obtaining media processing latency information from at least one rendering application executing at the at least one server, and obtaining client device operational information from the at least one display apparatus;

processing the quality of service information, the media processing latency information, and the client device operational information together for generating streaming configuration parameters;

controlling the at least one rendering application to generate images for displaying at the at least one display apparatus and sending the images via the communication network to the at least one display apparatus, according to the generated streaming configuration parameters; and activating a delay mechanism that temporarily pauses current data transmission and subsequently allows burst transmission of a pending stream of data packets to the at least one display apparatus for clearing network send queues to free up network bandwidth prior to the upcoming transmission, based on an input indicative of an upcoming transmission of a stream of data packets from the at least one display apparatus to the at least one server.

2. The method of claim 1, wherein generating the streaming configuration parameters comprise generating at least one of: a congestion control parameter, error correction data, a predicted network latency, a predicted rendering latency, a synchronization parameter for rendering, an encoding setting, a display setting, or a rate at which tracking data is received by the at least one server from the at least one display apparatus.

3. The method of claim 1, further comprising:
obtaining, from the at least one display apparatus, the input indicative of an upcoming transmission of a stream of data packets from the at least one display apparatus to the at least one server; and
performing a transmission of a pending stream of data packets from the at least one server to the at least one display apparatus on priority to clear network send queues, based on said input, to free up network bandwidth prior to the upcoming transmission.

4. The method of claim 1, further comprising:
obtaining, from the at least one display apparatus, information indicative of at least a gaze direction of a given eye of a user of the at least one display apparatus and at least one of: a gaze velocity, a gaze acceleration, of the given eye;
determining an amount of variation in visual content that is to be represented in an encoded video stream which is to be transmitted from the at least one server to the at least one display apparatus, based on the information; and
adjusting at least one of: a network setting, an encoding setting, for transmission of the encoded video stream, based on the amount of variation.

5. The method of claim 1, further comprising:
determining whether the quality of service information is indicative of challenging network conditions;
determining an expected error in pose information prediction and gaze information prediction; and
when it is determined that the quality of service information is indicative of challenging network conditions and the expected error is less than a predetermined threshold, reducing a frequency of obtaining subsequent pose information and subsequent gaze information from the at least one display apparatus.

6. The method of claim 1, further comprising:
obtaining at a given server amongst at least two servers, from at least one remaining server from amongst the at least two servers, network traffic characteristics corresponding to the at least one remaining server, wherein at least one other display apparatus is communicably coupled to the at least one remaining server;
determining a correlation between network traffic characteristics of the given server and the obtained network traffic characteristics corresponding to the at least one remaining server; and
adjusting at least one setting of the given server, based on the correlation.

7. A computer program comprising instructions which, when the program is executed by a processor, cause the processor to carry out the method of claim 1.

8. A non-transitory computer-readable medium comprising instructions which, when executed by a processor, cause the processor to carry out the method of claim 1.

9. A data processing system comprising at least one server communicably couplable to at least one display apparatus, wherein the at least one server comprises at least one processor configured to:
obtain a quality of service information from a network traffic regulator of a communication network, wherein the communication network is between the at least one server and the at least one display apparatus, obtain media processing latency information from at least one rendering application executing at the at least one server, and obtain client device operational information from the at least one display apparatus;
process the quality of service information, the media processing latency information, and the client device operational information together to generate streaming configuration parameters;
control the at least one rendering application to generate images for displaying at the at least one display apparatus and send the images via the communication network to the at least one display apparatus, according to the generated streaming configuration parameters; and
activate a delay mechanism that temporarily pauses current data transmission and subsequently allows burst transmission of a pending stream of data packets to the at least one display apparatus for clearing network send queues to free up network bandwidth prior to the upcoming transmission, based on an input indicative of an upcoming transmission of a stream of data packets from the at least one display apparatus to the at least one server.

10. The data processing system of claim 9, wherein the streaming configuration parameters comprise at least one of: a congestion control parameter, error correction data, a predicted network latency, a predicted rendering latency, a synchronization parameter for rendering, an encoding setting, a display setting, a rate at which tracking data is received by the at least one server from the at least one display apparatus.

11. The data processing system of claim 9, wherein the at least one processor is further configured to:
obtain, from the at least one display apparatus, the input indicative of an upcoming transmission of a stream of data packets from the at least one display apparatus to the at least one server; and
perform a transmission of a pending stream of data packets from the at least one server to the at least one display apparatus on priority to clear network send queues, based on said input, to free up network bandwidth prior to the upcoming transmission.

12. The data processing system of claim 9, wherein the at least one processor is further configured to:
- obtain, from the at least one display apparatus, information indicative of at least a gaze direction of a given eye of a user of the at least one display apparatus and at least one of: a gaze velocity, a gaze acceleration, of the given eye;
- determine an amount of variation in visual content that is to be represented in an encoded video stream which is to be transmitted from the at least one server to the at least one display apparatus, based on the information; and
- adjust at least one of: a network setting, an encoding setting, for transmission of the encoded video stream, based on the amount of variation.

13. The data processing system of claim 9, wherein the at least one processor is further configured to:
- determine whether the quality of service information is indicative of challenging network conditions;
- determine an expected error in pose information prediction and gaze information prediction; and
- when it is determined that the quality of service information is indicative of the challenging network conditions and the expected error is less than a predetermined threshold, reduce a frequency of obtaining subsequent pose information and subsequent gaze information from the at least one display apparatus.

14. The data processing system of claim 9, wherein the data processing system comprises at least two servers communicably coupled to each other, and wherein a given server amongst the at least two servers is configured to:
- obtain, from at least one remaining server from amongst the at least two servers, network traffic characteristics corresponding to the at least one remaining server, wherein at least one other display apparatus is communicably coupled to the at least one remaining server;
- determine a correlation between network traffic characteristics of the given server and the obtained network traffic characteristics corresponding to the at least one remaining server; and
- adjust at least one setting of the given server, based on the correlation.

* * * * *